United States Patent Office 2,831,896
Patented Apr. 22, 1958

2,831,896

COMPOSITIONS OF POLYTHIOLS AND METHOD OF MAKING THE SAME

Earl D. Holly, Midland, Mich., assignor to The Dow Chemical Company, Midland, Mich., a corporation of Delaware No Drawing. Application April 4, 1956
Serial No. 575,973

9 Claims. (Cl. 260—609)

This invention concerns certain new compositions which are mixtures of polythiols in liquid form and pertains to a method of making the same. It relates more particularly to a novel procedure for converting a portion of a dithiol starting material into a higher polythiol containing at least three thiol groups in the molecule to obtain a liquid composition comprised essentially of a mixture of the dithiol starting material and a higher polythiol and so reactive that upon suitable treatment it may be converted into an insoluble cross-linked polysulfide polymer.

It is known that polythiols containing two or more thiol groups in the molecule or polysulfide liquid polymers containing terminal thiol groups can be converted from liquids to high polymers by suitable treatment. The most useful reaction for such purpose is that of direct oxidation. J. S. Jorczak and E. M. Fettes, Ind. Eng. Chem., vol. 43, pages 324–328 (1951), describe the preparation of polysulfide liquid polymers and the oxidation of the same.

The oxidation of dithiols results in the formation of solid linear polysulfide polymers which have very little power of recovery, possess the disadvantage of cold flow and are soluble in many of the commonly used organic solvents, e. g. ethylene dichloride, chloroform, trichloroethane, etc. By bridging the linear chains with cross connecting links or groups of atoms, the power of recovery, resistance to cold flow and insolubility in usual organic solvents can be imparted to the polymers. A method for making cross-linked polysulfide polymers from polythiols is to incorporate with a dithiol starting material a higher polythiol containing from three to four or more thiol groups in the molecule in the desired proportion and subject the mixture to oxidation to obtain a solid polysulfide polymer. However, polythiols containing three or more thiol groups in the molecule are difficult to manufacture and are costly.

It is an object of the invention to provide new compositions of matter which are mixtures of polythiols in liquid form and so reactive that upon suitable treatment they may be converted into insoluble cross-linked polysulfide polymers. Another object is to provide a method of converting a portion of a dithiol starting material into a higher polythiol containing at least three thiol groups in the molecule to obtain a reactive liquid composition comprising essentially a mixture of the dithiol starting material and a higher polythiol. A further object is to provide a method of making such reactive polythiol liquid compositions containing a predetermined and controllable number of thiol units. Other and related objects may appear from the following description of the invention.

According to the invention, the foregoing and related objects are obtained by a procedure which involves converting a minor portion of a liquid dithiol, i. e. a dimercaptan starting material, hereinafter defined, into the corresponding monoalkali metal derivative and reacting said alkali metal derivative with a chemically equivalent proportion of a polyhalo organic compound selected from the group consisting of 2,4,6-tri(chloromethyl)-1,3,5-trioxane and acyclic and alicyclic polyhalohydrocarbons containing from one to six carbon atoms and from three to six chlorine or bromine atoms in the molecule in the presence of the remaining portion of the dithiol starting material, to obtain a reactive polythiol liquid composition which is a mixture comprising essentially a major proportion of the dithiol starting material and a minor proportion of a higher polythiol containing three or more thiol groups in the molecule.

Polyhalo organic compounds which can be employed in the process are the cyclic trimer of chloroacetaldehyde or the acyclic or alicyclic polyhalohydrocarbons containing from 1 to 6 carbon atoms and from 3 to 6 chlorine or bromine atoms in the molecule. Examples of suitable polyhalohydrocarbons are chloroform, carbon tetrachloride, 1,1,2-trichloroethane, trichloroethylene, 1,1,1-trichloroethane, tetrachloroethylene, 1,1,2,2 - tetrachloroethane, 1,1,1,2-tetrachloroethane, 1,2,3-trichloropropane, 1,2,3-tribromopropane, 1,1,1-trichloropropane, 1,1,3-trichloropropane, 1,2,4-tribromobutane, 1,2,3,4-tetrabromobutane, 1,2,3,4-tetrachlorobutane, 2,2,3,3-tetrachlorobutane, 1,6-dibromo-3,3,4,4-tetrachlorohexane, 1,2,2,3-tetrachloropropane, 1,1,2,2-tetrachloropropane, 1,2,3-trichloro-2-methylpropane, 1,2,3,4-tetrabromobutane, 1,2,3,4-tetrachlorobutane, 1,1,1,2,2-pentachlorohexane or benzene hexachloride. Mixtures of any two or more of the polyhalo organic compounds can be used.

The dithiols to be employed as starting materials are (A) dithiols of the general formula $$HSCH_2CH_2O—(C_nH_{2n}O)_m—CH_2CH_2SH$$

wherein $n$ and $m$ independently represent an integer from 1 to 4, and (B) dithiols of the formula HS—R—SH wherein R represents an alkylene radical containing from 6 to 8 carbon atoms in the molecule. Examples of suitable dithiols or dimercaptans are shown in the following Table I:

TABLE I

HSCH₂CH₂CH₂CH₂CH₂SH
HSCH₂CH₂CH₂CH₂CH₂CH₂CH₂CH₂SH
HSCH₂CH₂OCH₂CH₂OCH₂CH₂SH
HSCH₂CH₂OCH₂CH₂CH₂OCH₂CH₂SH
HSCH₂CH₂OCH₂CH₂CH₂CH₂OCH₂CH₂SH
HSCH₂CH₂OCH₂CH₂OCH₂CH₂OCH₂CH₂SH
HSCH₂CH₂OCH₂CH₂OCH₂CH₂OCH₂CH₂OCH₂CH₂SH
HSCH₂CH₂OCH₂CH₂OCH₂CH₂OCH₂CH₂OCH₂CH₂OCH₂CH₂SH
HSCH₂CH₂OCH(CH₃)CH₂OCH₂CH₂SH
HSCH₂CH₂O(C₃H₆O)₂CH₂CH₂SH
HSCH₂CH₂O(C₃H₆O)₃CH₂CH₂SH
HSCH₂CH₂O(C₃H₆O)₄CH₂CH₂SH
HSCH₂CH₂OCH(C₂H₅)CH₂OCH₂CH₂SH
HSCH₂CH₂OCH(CH₃)CH(CH₃)OCH₂CH₂SH

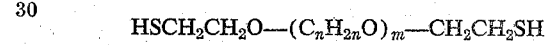

HSCH₂CH₂OCH₂CH₂OCHCH₂OCH₂CH₂SH
|
CH₃

Mixtures of any two or more of the dithiols can be used.

A portion of a dithiol starting material can be converted to the corresponding monoalkali metal derivative by reacting the dithiol with less than a chemically equivalent amount of an alkali-acting material such as an alkali metal, e. g. sodium, potassium or lithium, an alkali metal hydroxide or an alkali metal alcoholate. The reaction which occurs readily at room temperature or thereabout is usually carried out in a liquid reaction medium comprising a lower aliphatic alcohol such as methyl alcohol, ethyl alcohol, isopropyl alcohol, etc., or an aqueous solution containing the alcohol in a concentration of 50 percent by weight or greater.

The reaction medium, i. e. the lower aliphatic alcohol or an aqueous solution of the same is employed in an amount sufficient to substantially maintain the reactants in solution or form a mixture or slurry which can conveniently be stirred. The reaction medium may be used in as large a proportion as desired.

The alkali-acting material, i. e. the alkali metal, the alkali metal hydroxide or the alkali metal alcoholate, can be employed in amounts corresponding to from 0.002 to 1, preferably from 0.01 to 0.5, gram atomic proportion of alkali metal per gram molecular equivalent proportion of the dithiol starting material.

The monoalkali metal derivative of the dithiol is usually prepared by dissolving the dithiol starting material in an equal volume of alcohol, e. g. ethyl alcohol (95%), and adding the alkali-acting material such as sodium metal, sodium hydroxide or sodium alcoholate thereto with stirring in the desired proportion.

The monoalkali metal derivative of the dithiol is reacted with a polyhalo organic compound such as the cyclic trimer of chloroacetaldehyde or an acyclic or an alicyclic polyhalohydrocarbon as previously defined, in the solution in which it is prepared, i. e. in the presence of the remaining portion of the dithiol starting material and the liquid reaction medium in which it was prepared, by adding to the mixture an amount of the polyhalohydrocarbon corresponding approximately to one gram atomic proportion of halogen per gram atomic proportion of alkali metal in the mixture. The resulting mixture is maintained at reaction temperatures between 20° and 120° C., preferably from 60° to 110° C. and under a pressure at least sufficient to maintain the mixture substantially in liquid phase under the conditions employed. The reaction can be carried out at atmospheric or superatmospheric pressures.

Upon completing the reaction, the product is recovered in usual ways, e. g. by heating the crude reaction product, preferably at subatmospheric pressures, to distill and separate the lower boiling solvent or reaction medium from the polythiol product, then filtering the liquid product to separate or substantially free the product from insoluble material, e. g. the alkali metal salt formed in the reaction.

In practice, an alkali-acting material, e. g. sodium metal or sodium hydroxide, is added to a lower aliphatic alcohol such as methyl alcohol, ethyl alcohol or isopropyl alcohol to form a solution containing the corresponding alkali metal alcoholate or alkali metal hydroxide in the desired proportion. The dithiol starting material is added thereto in the desired proportion. Thereafter, the polyhalo organic compound, e. g. 1,2,3-trichloropropane or perchloroethylene, is added in amount corresponding to approximately a stoichiometric proportion of the polyhalo organic compound per gram atomic proportion of alkali metal in the mixture. The resulting mixture is preferably stirred and maintained at temperatures between 20° and 120° C. until the reaction is complete. The reaction is usually complete in a period of from 10 minutes to 24 hours or longer, depending for the most part upon the temperature employed. The mixture should not be heated at elevated temperatures for prolonged periods of time or at reaction temperatures substantially greater than about 120° C. in order to avoid deterioration or condensation of the polythiol product which results in partial polymerization of the product to form polysulfide polymers. The reaction is preferably carried out in the absence or substantial absence of air or oxygen, although the reaction can be carried out in the presence of a limited amount of air such as under reflux.

Upon completing the reaction, the mixture is heated, preferably under subatmospheric pressures, to distill and separate the lower boiling liquid reaction medium, e. g. alcohol, from the product. The residue or liquid product is separated from the by-product solid material in usual ways, e. g. by decanting or filtering.

The crude reaction mixture, if alkaline, i. e. if of a pH value greater than 7, is usually treated with an acid such as hydrochloric acid to bring the liquid to a pH value between 5 and 6 prior to recovering the polythiol product, but such procedure is not required.

The product, i. e. the liquid mixture of polythiols, is useful for a variety of applications. It can be cured to transform the liquid to the solid condition to form insoluble cross-linked polysulfide polymers. Oxidation is one step used for that purpose. The product may be mixed with liquid polysulfide polymers having a molecular weight of from about 500 to 15,000 and the mixture cured or oxidized to the solid condition to form rubber-like polysulfide polymers which are useful for a variety of applications. The product may be incorporated with solid polysulfide polymers to facilitate processing or to secure the advantages of liquid polysulfide polymers over solid polymers.

The invention provides a new and improved method for making reactive liquid compositions from dithiols which compositions are capable of being cured to the solid condition to form insoluble cross-linked polysulfide polymers.

The following examples illustrate ways in which the principle of the invention has been applied, but are not to be construed as limiting its scope.

*Example 1*

A charge of 283 grams of di-(2-mercaptoethyl) ether of diethylene glycol, a dithiol of the formula

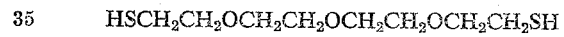

$HSCH_2CH_2OCH_2CH_2OCH_2CH_2OCH_2CH_2SH$ was added to a solution of 350 ml. of absolute ethyl alcohol containing 12.08 grams of sodium hydroxide in a glass reaction vessel equipped with a stirrer and reflux condenser. The mixture was stirred and 14.15 grams of 1,2,3-trichloropropane added. The resulting mixture was heated at a temperature of 80° C. for a period of 2 hours while slowly bubbling a stream of nitrogen gas through the mixture, then cooled to room temperature. Concentrated aqueous hydrochloric acid solution was added to bring the liquid to a pH value between 5 and 6. Thereafter, the mixture was heated under an absolute pressure of 20 millimeters to distill and separate the alcohol from the product. The product was heated to a temperature of 93° C. under an absolute pressure of 20 millimeters, then filtered to remove the by-product sodium chloride formed in the above-mentioned reaction. There was obtained 245 grams of a pale yellow mobile liquid. The product was a reactive liquid mixture of the dithiol starting material and a higher polythiol containing three thiol groups in the molecule prepared in situ as described above.

*Example 2*

A purpose of this example is to show a utility for the liquid composition prepared in Example 1. A charge of 241 grams of the liquid product prepared in Example 1, was placed in a glass reaction vessel, together with 17 ml. of a dithiol of the formula

$HSCH_2CH_2OCH_2CH_2OCH_2CH_2OCH_2CH_2SH$ containing 0.0027 gram of anhydrous ferric chloride. The mixture was heated at temperatures between 90° and 93° C. on a steam bath. Thereafter, a stream of oxygen was bubbled through a concentrated aqueous solution of ammonium hydroxide (approximately 29 weight percent ammonia) and the moist oxygen gas containing vapors of ammonia was bubbled through the liquid starting material containing the ferric chloride over a period of 3.5 hours, at a rate such that a slight excess of oxygen was present in the exit gases vented from the reaction vessel. The feed of oxygen gas was discontinued and the product was allowed to cool to room temperature. The product was a pale yellow colored polysulfide liquid polymer having an absolute viscosity of 990 centipoises at 25° C. The liquid polysulfide polymer was capable of being further cured or oxidized to form an insoluble cross-linked polysulfide polymer.

*Example 3*

A charge of 34.7 grams of 1,6-dithiohexane of the formula $HSCH_2CH_2CH_2CH_2CH_2CH_2SH$ was added to a solution of 50 ml. of absolute ethyl alcohol containing 2.5 grams of sodium hydroxide. A charge of 2.83 grams of 1,2,3-trichloropropane was added. The resulting mixture was heated at a temperature of 80° C. for a period of 10 hours, then was allowed to cool. The liquid was decanted from the by-product salt formed in the reaction. The product was obtained as a reactive liquid polythiol composition dissolved in the alcohol reaction medium.

A portion of the solution of the liquid product was dissolved in an aqueous 1-normal sodium hydroxide solution. An aqueous 1-normal sodium hypochlorite solution was added to oxidize the polythiols. A white precipitate was obtained. The precipitate was separated, washed with water and was dried. It was swollen by, but was insoluble in, chloroform.

For purpose of comparison, a charge of 1,6-dithiohexane was oxidized by similar procedure. There was obtained a solid wax-like product. It was soluble in chloroform.

*Example 4*

A charge of 56.5 grams of di-(2-mercaptoethyl)ether of diethylene glycol of the formula

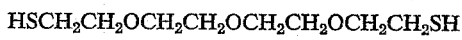
$HSCH_2CH_2OCH_2CH_2OCH_2CH_2OCH_2CH_2SH$ was added to a solution of 48 ml. of 95 percent ethyl alcohol containing 2.56 grams of sodium hydroxide. Thereafter, 2.83 grams of hexachlorobenzene, $H_6C_6Cl_6$, was added. The mixture was heated at a temperature of 80° C. for a period of 2 hours, then was cooled to room temperature. The product was a reactive liquid polythiol composition and was capable of being oxidized to form an insoluble cross-linked polysulfide polymer.

*Example 5*

A charge of 56.5 grams of di-(2-mercaptoethyl)ether of diethylene glycol similar to that employed in Example 4, was added to a solution of 60 ml. of absolute ethyl alcohol containing 7.60 grams of sodium hydroxide. A charge of 8.4 grams of 1,2,3-trichloropropane was added. The mixture was heated at a temperature of 80° C. for a period of 2 hours. The product was a reactive liquid polythiol composition capable of being oxidized or cured to form an insoluble cross-linked polysulfide polymer.

*Example 6*

A charge of 56.5 grams (0.25 mole) of di-(2-mercaptoethyl)ether of diethylene glycol of the formula

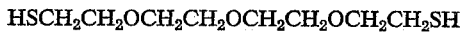
$HSCH_2CH_2OCH_2CH_2OCH_2CH_2OCH_2CH_2SH$ was added to a solution of 68 ml. of absolute alcohol containing 1.5 grams of sodium hydroxide. Thereafter, 1.5 grams (0.012 mole) of 2,4,6-tri(chloromethyl) 1,3,5-trioxane (cyclic trimer of chloroacetaldehyde) was added. The mixture was heated at a temperature of 80° C. under reflux for a period of 2 hours, then was cooled. The product is recovered by evaporating or distilling the alcohol solvent and filtering the residue to separate the by-product salt. The product was a reactive liquid mixture of polythiols and was capable of being oxidized to form an insoluble cross-linked polysulfide polymer.

*Example 7*

A charge of 15 pounds of di-(2-mercaptoethyl)ether of diethylene glycol of the formula

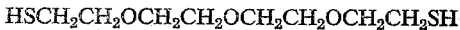
$HSCH_2CH_2OCH_2CH_2OCH_2CH_2OCH_2CH_2SH$ was added with stirring to a solution of 9 liters of absolute ethyl alcohol containing 0.64 pound of sodium hydroxide. Thereafter, 1.43 pounds of 1,2,3-tribromopropane was added. The resulting mixture was stirred and heated at a temperature of 80° C. for a period of about 30 minutes while distilling a portion of the alcohol therefrom, then was gradually heated to a temperature of 120° C. at an absolute pressure of 20 millimeters, to remove the rest of the alcohol, then was cooled to a temperature of 50° C. The residue was treated with concentrated aqueous hydrochloric acid solution to bring the residual liquid to a pH value of 5, and was filtered to separate the liquid product from the by-product salt. There was obtained 14.43 pounds of liquid product. The product was a mobile yellow liquid consisting of a mixture of the dithiol starting material and the higher polythiol containing three thiol groups in the molecule, prepared in situ as described above. The polythiol product was capable of being oxidized to form reactive liquid polysulfide polymers or solid insoluble cross-linked polysulfide polymers depending upon the degree of oxidation employed.

*Example 8*

A charge of 56.5 grams of di-(2-mercaptoethyl)ether of diethylene glycol of the formula

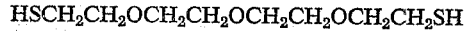
$HSCH_2CH_2OCH_2CH_2OCH_2CH_2OCH_2CH_2SH$ was added to a solution of 40 ml. of absolute ethyl alcohol containing 3.00 grams of sodium hydroxide. The mixture was stirred and 2.83 grams of 1,1,2,2-tetrachloroethane was added. The resulting mixture was maintained at room temperature for a period of 24 hours. Thereafter, the liquid was decanted from the sodium chloride by-product formed in the reaction. Hydrochloric acid was added to bring the liquid to a pH value of 6. The product was recovered by evaporating the alcohol on a steam bath. The product was a mobile liquid. It was capable of being oxidized to form an insoluble cross-linked polysulfide polymer.

*Example 9*

A charge of 56.5 grams of di-(2-mercaptoethyl)ether of diethylene glycol of the formula

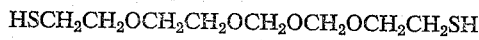
$HSCH_2CH_2OCH_2CH_2OCH_2CH_2OCH_2CH_2SH$ was added to 60 ml. of absolute ethyl alcohol containing 3.45 grams of sodium methoxide. A charge of 2.83 grams of 1,2,3-trichloropropane was added. The mixture was heated at a temperature of 80° C. for a period of 18 hours, then cooled. The liquid was decanted from the by-product salt formed in the reaction. The solution of the liquid polythiol product was mixed with 0.001 percent by weight of anhydrous ferric chloride and was heated on a steam bath at temperatures between 75° and 95° C. while passing a stream of oxygen gas containing vapors of ammonia through the same, employing procedure similar to that described in Example 2, over a period of 6.5 hours. The alcohol solvent was evaporated. The mobile liquid polythiol product was converted into a reactive polysulfide liquid polymer having an absolute viscosity of 1075 centipoises at 25° C. Two grams of the liquid polysulfide polymer was mixed with 2 grams of "C-5 Cure," a mixture of 50 parts by weight of lead dioxide $PbO_2$, 5 parts of stearic acid and 45 parts of dibutyl phthalate. The mixture was poured onto a clean glass plate and allowed to stand in air at room temperature for a period of 24 hours. There was obtained a solid product. It was insoluble in chloroform.

Reactive liquid polythiol compositions consisting of mixtures of a major proportion of a dithiol and a minor proportion of a higher polythiol containing at least three thiol groups in the molecule, have been prepared by procedure similar to that set forth in the foregoing examples employing trichloroethylene, chloroform, carbon tetrachloride, 1,1,2,2-tetrachloroethane, 1,1,1-trichloroethane or tetrachloroethylene, in place of the 1,2,3-trichloropropane. In all such experiments the mobile liquid compositions have been found to be capable of being oxidized or cured upon suitable treatment to form reactive polysulfide liquid polymers or to form solid insoluble cross-linked polysulfide polymers, depending upon the degree of oxidation of curing employed.

I claim:

1. A method of making a polythiol composition comprising essentially a mixture of a major amount of a dithiol and a minor amount of a polythiol containing at least three thiol groups in the molecule, which method comprises (1) reacting a dithiol selected from the group consisting of (A) dithiols of the formula:

$$HSCH_2CH_2O-(C_nH_{2n}O)_m-CH_2CH_2SH$$

wherein $n$ and $m$ each independently represent an integer from 1 to 4, and (B) dithiols of the formula:

$$HS-R-SH$$

wherein R represents an alkylene radical containing from 6 to 8 carbon atoms, with an alkali-acting substance selected from the group consisting of alkali metals, alkali metal hydroxides and alkali metal alcoholates, in amount corresponding to from 0.002 to 1 gram atomic proportion of alkali metal per gram molecular equivalent proportion of the dithiol, the said reaction being carried out in the presence of a liquid reaction medium comprising a lower alkyl alcohol containing from 1 to 3 carbon atoms in the molecule whereby at least a portion of the dithiol starting material is converted to the corresponding monoalkali metal derivative, (2) adding to the mixture a polyhalo organic compound selected from the group consisting of 2,4,6-tri(chloromethyl)-1,3,5-trioxane benzene hexachloride and saturated aliphatic and monoethylenically unsaturated aliphatic polyhalohydrocarbons containing from 1 to 6 carbon atoms and from 3 to 6 halogen atoms selected from the group consisting of bromine and chlorine atoms in the molecule, in amount corresponding approximately to one gram atomic proportion of halogen per gram equivalent atomic proportion of alkali metal in the mixture, and maintaining the resulting mixture at reaction temperatures between 20° and 120° C. and substantially in the liquid phase under the conditions employed, whereby at least a portion of the dithiol starting material is converted into a polythiol containing at least three thiol groups in the molecule.

2. A method as claimed in claim 1, whereby the dithiol is a dithiol of the formula:

$$HSCH_2CH_2O(C_nH_{2n}O)_mCH_2CH_2SH$$

wherein $n$ and $m$ independently represent an integer from 1 to 4.

3. A method as claimed in claim 2, wherein $n$ represents the integer 2.

4. A method as claimed in claim 1, wherein the dithiol is a dithiol of the formula HS—R—SH wherein R represents an alkylene radical containing from 6 to 8 carbon atoms.

5. A method of making a polythiol composition comprising essentially a mixture of a major amount of a dithiol and a minor amount of a polythiol containing at least three thiol groups in the molecule, which method comprises (1) reacting di-(2-mercaptoethyl)ether of diethylene glycol of the formula:

$$HSCH_2CH_2OCH_2CH_2OCH_2CH_2OCH_2CH_2SH$$

with an alkali-acting substance selected from the group consisting of alkali metals, alkali metal hydroxides and alkali alcoholates, in amount corresponding to from 0.01 to 0.5 gram atomic proportion of alkali metal per gram molecular proportion of the dithiol, the said reaction being carried out in the presence of a liquid reaction medium comprising a lower alkyl alcohol containing from 1 to 3 carbon atoms in the molecule whereby at least a portion of the dithiol starting material is converted to the corresponding monoalkali metal derivative, (2) adding to the mixture a polyhalo organic compound selected from the group consisting of 2,4,6-tri(chloromethyl)-1,3,5-trioxane, benzene hexachloride and saturated aliphatic and monoethylenically unsaturated aliphatic polyhalohydrocarbons containing from 1 to 6 carbon atoms and from 3 to 6 halogen atoms selected from the group consisting of chlorine and bromine atoms in the molecule, in amount corresponding approximately to one gram atomic proportion of halogen per gram atomic proportion of alkali metal in the mixture, (3) maintaining the resulting mixture at reaction temperatures between 20 and 120° C. and in the liquid phase under the conditions employed, whereby at least a portion of the dithiol starting material is converted into a polythiol containing at least three thiol groups in the molecule, and substantially freeing the polythiol product from the liquid reaction medium and the by-product alkali metal halide.

6. A method as claimed in claim 5, wherein the polyhalo organic compound is 1,2,3-trichloropropane.

7. A method as claimed in claim 5, wherein the polyhalo organic compound is 2,4,6-tri-(chloromethyl)-1,3,5-trioxane.

8. A method as claimed in claim 5, wherein the polyhalo organic compound is 1,1,2,2-tetrachloroethane.

9. A method as claimed in claim 5, wherein the polyhalo organic compound is 1,2,3-tribromopropane.

References Cited in the file of this patent

UNITED STATES PATENTS

| | | |
|---|---|---|
| 2,230,966 | Reid et al. | Feb. 4, 1941 |
| 2,402,665 | Peppel et al. | June 25, 1946 |